Nov. 25, 1958  R. F. ONSRUD  2,862,120
FLUID-COOLED MOTOR HOUSING
Filed July 2, 1957  2 Sheets-Sheet 1

INVENTOR:
RUDOLPH F. ONSRUD
BY
ATT'YS

Nov. 25, 1958  R. F. ONSRUD  2,862,120
FLUID-COOLED MOTOR HOUSING
Filed July 2, 1957  2 Sheets-Sheet 2

INVENTOR:
RUDOLPH F. ONSRUD
BY
ATT'YS

United States Patent Office 2,862,120
Patented Nov. 25, 1958

2,862,120
FLUID-COOLED MOTOR HOUSING

Rudolph F. Onsrud, Chicago, Ill., assignor to Onsrud Machine Works, Inc., Chicago, Ill.

Application July 2, 1957, Serial No. 669,495

5 Claims. (Cl. 310—54)

This invention relates to fluid-cooled electric motor housings.

The main objects of this invention are to provide an improved form of fluid-cooled housing for electric motors; to provide an improved housing of this kind wherein the motor armature and stator coils are eccentrically disposed within the housing; and to provide an improved form of eccentrically-arranged fluid-cooled motor-housing of welded-steel construction which is economical to manufacture, light in weight, and efficient in use.

Figure 1:
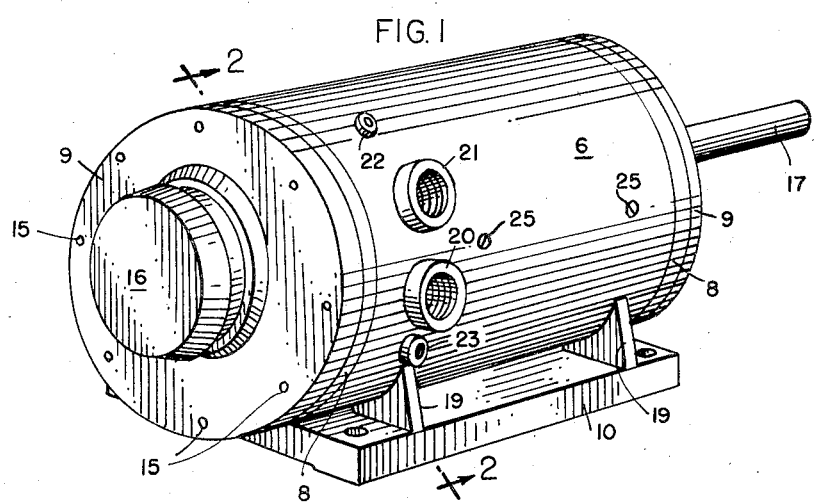
Figure 1 is a perspective view of an eccentrically-arranged, fluid-cooled motor housing constructed in accordance with this invention.

The essential concept of this invention involves a pair of annular steel shells of differing diameters supported in eccentric relationship by a plurality of longitudinally-disposed and circumferentially-spaced baffle ribs of variably-graduated heights welded between the shells to produce a fluid-flow labyrinth between the shells and within the inner of which shells is telescopically mounted the motor stator and rotor with the motor shaft eccentrically-located with respect to the outer shell.

A fluid-cooled motor housing embodying the foregoing concept comprises a pair of shells 5 and 6 supported in eccentric relationship by a series of variously-dimensioned, axially extending, radial baffle ribs 7; the ends of which shells are closed by superimposed rings 8 and motor-bearing support-plates 9. As shown, the housing is mounted on a supporting base 10.

The shells 5 and 6 are sections of machined steel tubing of different diameters and of equal lengths as determined by the character of the motor which is to be housed therein. The inner shell 5 is of an inside diameter substantially equal to that of the outside diameter of the motor stator 11 to permit easy but snug telescopic assembly of the stator 11 within the shell 5.

Figure 2:
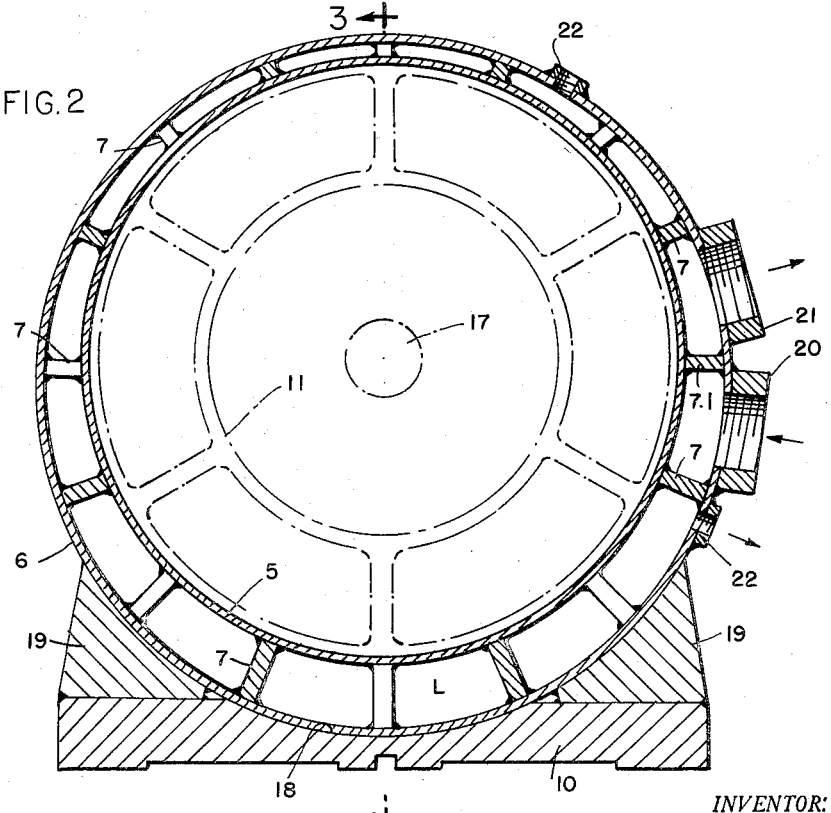
Fig. 2 is an enlarged, transverse, sectional elevation of the housing as viewed from the plane of the line 2—2 of Fig. 1.
Figure 4:
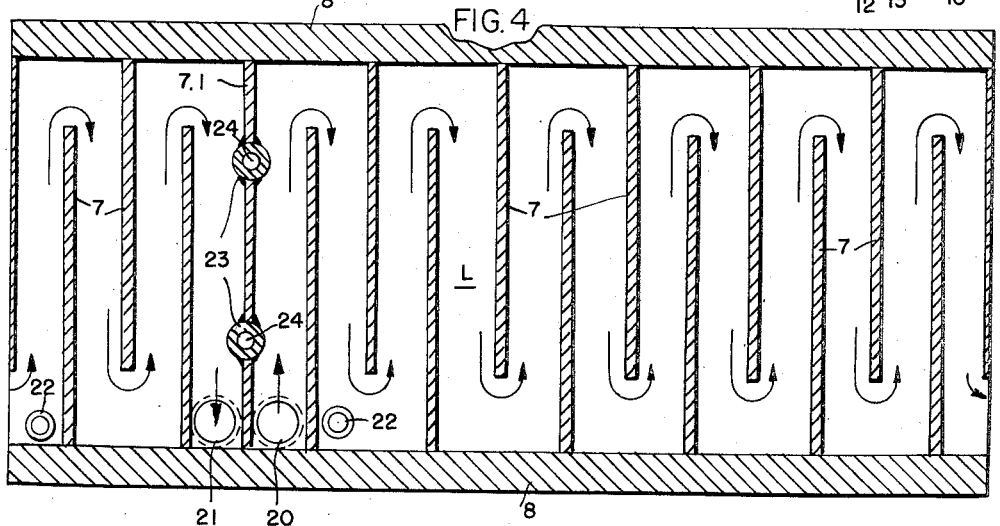
Fig. 4 is a developed view of the coolant-flow labyrinth formed in the housing.

The baffle ribs 7 also are of steel and are of angularly graduated varying heights, as is most apparent from Fig. 2. These ribs 7 are interposed radially between the shells 5 and 6 and extend longitudinally or axially thereof in appropriate angularly or circumferentially-spaced relationship. The ribs are of substantially equal length but less than the length of the shells 7 and 8 and alternate ribs are staggered in the axial direction so that one end of each rib abuts one of the end rings 8 and has its opposite end spaced from the opposite end ring 8 thereby forming a labyrinth passage L extending longitudinally and circumferentially of the assembled shells 5 and 6 as shown in Fig. 4. To provide a beginning and end for the passage L one of the radial ribs 7.1 is made to extend from one end ring 8 to the other.

The rings 8, likewise formed of steel, have the inner and outer diameters substantially equal to the inside and outside diameters of the shells 5 and 6 respectively and with the same eccentricity of centers. Thus, when the rings are assembled on the eccentrically-arranged shells 5 and 6, the inner and outer ring faces are substantially flush with the inside and outside surfaces of the shells 5 and 6, respectively (see Fig. 3).

Each of the rings 8 has an axially projecting flange 12 integrally formed on one face thereof. The inner and outer diameters of each of these flanges 12 are substantially equal to and concentric with the outside and inside diameters of the inner and outer shells 5 and 6 respectively. Thus, the rings 8 may be positioned on the shells 5 and 6 with the flanges 12 telescopically fitting in and sealing the eccentric spaces between the shells 5 and 6. In such positions the rings 8 are welded to the ends of the shells 5 and 6 as indicated at 13 in Fig. 3. At equi-distant points, around the outer face thereof, each ring 8 has tapped holes 14 wherein to receive machine screws 15 for securing in place the end plates 9.

The end plates 9 here are shown in the form of disks, also made of steel. Each plate mounts an eccentric hub 16 wherein is located a suitable frictionless bearing (not shown) for the shaft 17 of a rotor whose stator 11 telescopically fits in the inner shell 5. The plates 9 are secured in place by the machine screws 15 seated in the threaded holes 14 in the rings 8 and thus constitute the closure for the open ends of the motor housing comprising the eccentrically-arranged shells 5 and 6.

The base 10, likewise of steel, has an arcuate-shaped medially-disposed longitudinal recess 18 formed in one face wherein the outer shell 6 seats, and several longitudinally-spaced gussets 19 are interposed between and welded to the shell 6 and the base 10 (Figs. 1 and 2) to provide a unitary structure. The base 10 is machined and drilled with suitable holes to provide for its appropriate mounting to locate the motor-shaft 17 in working position.

As shown in Figs. 1 to 4, internally threaded bosses 20 and 21, of suitable form, are welded to the outer shell 6, in registery with suitable openings therethrough on each side of the rib 7.1 to provide inlet and outlet ports for the coolant to and from the labyrinth L. Also, one or more smaller bosses 22 are likewise secured to the shell 6 at suitable locations to provide passages for draining of the labyrinth L when emptying the housing is desired.

At at least two points along the one passage-dividing rib 7.1, radially projecting cores 23 are inserted in the rib 7.1 and welded to the inner shell 5 of the motor housing and then drilled to provide holes 24 for set screws or bolts 25 which are inserted through suitable registering apertures in the outer shell 6 to anchor the motor stator to the housing. The cores 23 are continuous welded circumferentially to the inner shell 5 to provide a liquid tight connection therewith and the outer ends of the cores together with the outer edges of the ribs 7 and 7.1 are machined to fit the curvature of the outer shell 6 to which the cores are also welded, as by plug welding, when the shells are assembled.

The major successive steps in the assembly of this fluid-cooled motor housing are as follows:

Assuming all of the parts—shells 5 and 6, baffle ribs 7, cores 23 and dividing rib sections 7.1, rings 8, plates 9, and base 10—have been at least preliminarily machined, the baffle ribs 7 and the dividing rib and cores are first welded to the outer face of the inner shell 5 in properly positioned sequence according to their graduated heights. The edges of the ribs and the ends of the cores are then machined to fit the eccentric curvature of the outer shell 6.

The outer shell 6 then has the inner shell 5 with the radiating ribs 7 telescoped therein. Thereupon the outer ends of the baffle ribs 7 and 7.1 and the cores 23 are welded to the inner face of the outer shell 6 by plug welding from the exterior thereof, in the manner conventional with assemblies of this kind.

Figure 3:
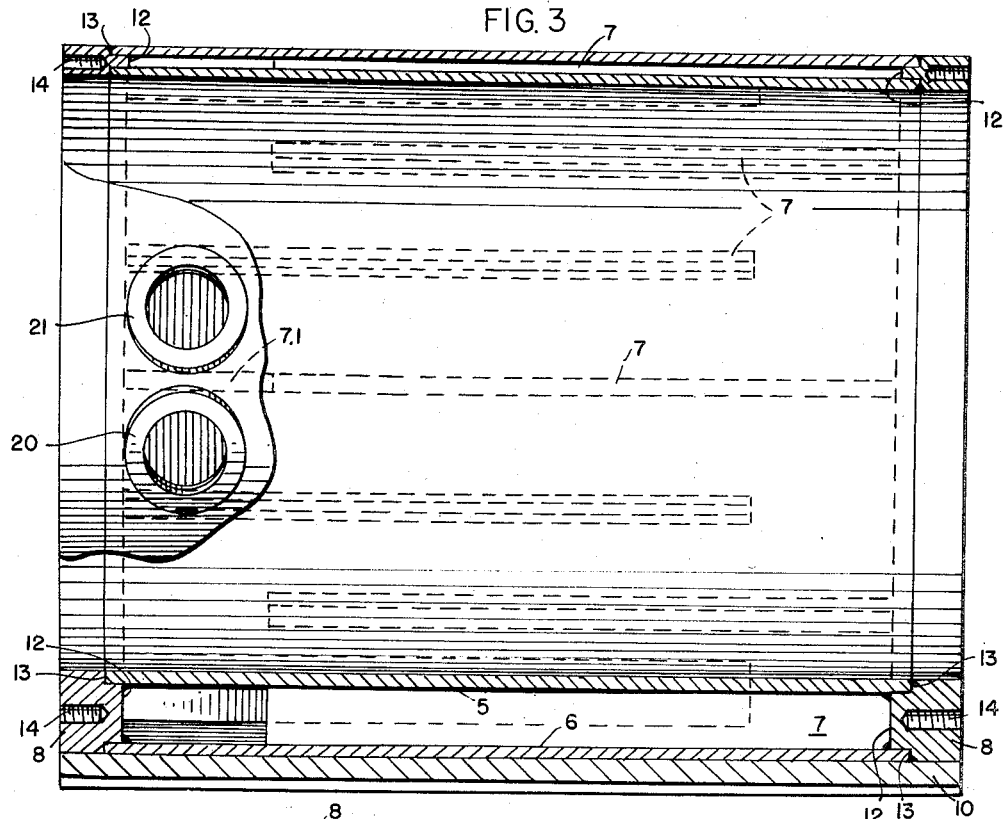
Fig. 3 is a longitudinal sectional view of the same taken on the plane of the line 3—3 of Fig. 2.

Next the rings 8 are placed in position and welded to the ends of the shells 5 and 6, as shown in Fig. 3, and the base 10 together with the gussets 19 are welded to the outer shell 6. Thereupon the housing assembly is pressure tested for leaks and if satisfactory is ready for the motor assembly.

The motor stator 11 is then telescoped into the inner shell 5 and the screws 25 are inserted into the holes 24 and set in the stator 11 to secure it against movement in the shell.

Subsequently the motor armature (not shown) and the end plates 9 are secured in place whereupon the motor is ready for attachment to the machine where it is to operate.

A welded-steel, fluid-cooled, eccentrically-arranged motor housing of this kind possesses several advantages over structures currently in use. Primary among these are the following:

The housing is less expensive to manufacture, is materially lighter in weight, and insures a better cooling due to the more extensive labyrinth of more numerous relatively large passages, a greater certainty that no leaks of cooling fluid to the interior of the motor will occur, and the complete elimination of clogging of the water passages with core sand which so often results with cast housings.

A further and particular advantage of the improved motor housing resides in the fact that, as a drive for a cutting tool, the motor shaft, may be positioned in a plane closer to the work than with concentrically housed motors. This permits a reduction in the cutter diameter of from one to three inches, which is especially advantageous for high speed work, and at the same time the cutter is less expensive and is of less weight.

Although but one specific embodiment of this invention is herein shown and described it will be understood that numerous details of the construction shown may be altered or omitted without departing from the spirit of the invention as defined by the following claims.

I claim:

1. A fluid-cooled motor housing comprising, annular imperforate shells of differing diameters, the inner of which is internally dimensioned to telescopically support a motor stator, the shells being supported in eccentric radially spaced relationship by a plurality of graduated-height longitudinally-disposed circumferentially-spaced baffle ribs forming a coolant-flow labyrinth longitudinally and circumferentially between the shells, and means mounted on the opposite ends of the eccentrically-arranged shells for supporting the end margins of the shells in their eccentric relationship and closing the space therebetween, the outer of said shells having inlet and outlet ports communicating with the labyrinth.

2. A fluid-cooled motor housing comprising, annular imperforate steel shells of differing diameters, the inner of which is internally dimensioned to telescopically support a motor stator, the shells being supported in eccentric radially-spaced relationship by a plurality of graduated-height longitudinally-disposed circumferentially-spaced steel baffle ribs welded to the shells with alternate ribs axially staggered and thereby forming a coolant flow labyrinth longitudinally and circumferentially between the shells, and closure members mounted on the opposite ends of the eccentrically-arranged shells for supporting the end margins of the shells in their eccentric relationship and closing the ends of the space therebetween, the outer shell having inlet and outlet ports communicating with the labyrinth.

3. A fluid-cooled motor housing comprising, annular imperforate shells of differing diameters, the inner of which is internally dimensioned to telescopically support a motor stator, the shells being supported in eccentric radially spaced relationship by a plurality of graduated-height longitudinally-disposed circumferentially-spaced baffle ribs forming a coolant flow labyrinth longitudinally and circumferentially between the shells, and a pair of end rings the inner and outer diameters of which are substantially equal to the inside and outside diameters of the inner and outer shells respectively, one face of each ring having formed thereon an axially projecting flange the inner and outer diameters of which flanges are substantially equal to and concentric with the outside and inside diameters of the inner and outer shells respectively, the rings being bonded to the opposite ends of the shells with the respective flanges telescopically seated between the open ends of the eccentrically-arranged shells to support the end margins of the shells in their eccentric relationship and seal the ends of the space therebetween, and said outer shell having inlet and outlet ports in its side wall communicating with the said labyrinth.

4. A fluid-cooled motor housing comprising annular imperforate shells of differing diameters, the inner of which is internally dimensioned to telescopically support a motor stator, the shells being supported in eccentric radially spaced relationship by a plurality of graduated-height longitudinally-disposed circumferentially-spaced baffle ribs forming a coolant-flow labyrinth longitudinally and circumferentially between the shells, a pair of end rings the inner and outer diameters of which are substantially equal to the inside and outside diameters of the inner and outer shells respectively, one face of each ring having formed thereon an axially projecting flange the inner and outer diameters of which flanges are substantially equal to an concentric with the outside and inside diameters of the inner and outer shells respectively, the rings being bonded to the opposite ends of the shells with the respective flanges telescopically seated between the open ends of the eccentrically-arranged shells, a pair of motor-shaft bearing plates bolted to the respective rings, said outer shell having inlet and outlet ports communicating with the labyrinth, a supporting base extending longitudinally of the eccentrically-arranged shells, and a plurality of radially-disposed longitudinally-spaced supporting gussets interposed between and welded to the outer shell and the base on opposite sides of the shell.

5. A fluid-cooled motor housing comprising, annular imperforate steel shells of differing diameters, the inner of which is internally dimensioned to telescopically support a motor stator, the shells being supported from each other in eccentric radially spaced relationship by a plurality of graduated-height longitudinally-disposed circumferentially-spaced steel baffle ribs welded to the shells, a pair of end rings the inner and outer diameters of which are substantially equal to the inside and outside diameters of the inner and outer shells respectively, one face of each ring having formed thereon an eccentric axially projecting flange the inner and outer diameters of which flanges are substantially equal to the outside and inside diameters of the inner and outer shells respectively, the rings being bonded to the opposite ends of the shells with the respective flanges telescopically seated between the open ends of the eccentrically-arranged shells, alternate baffle ribs being staggered to abut one end of each rib against one ring flange and space the opposite end from the other ring flange thereby forming a coolant-flow labyrinth longitudinally and circumferentially between the shells, and one baffle rib extending fron one end ring to the other, said outer shell having inlet and outlet ports communicating with the labyrinth one on each side of said one baffle rib.

References Cited in the file of this patent

UNITED STATES PATENTS

| 716,278 | Reist | Dec. 16, 1902 |
| 2,356,778 | Morrison | Aug. 29, 1944 |

FOREIGN PATENTS

| 665,703 | Germany | Oct. 1, 1938 |